UNITED STATES PATENT OFFICE.

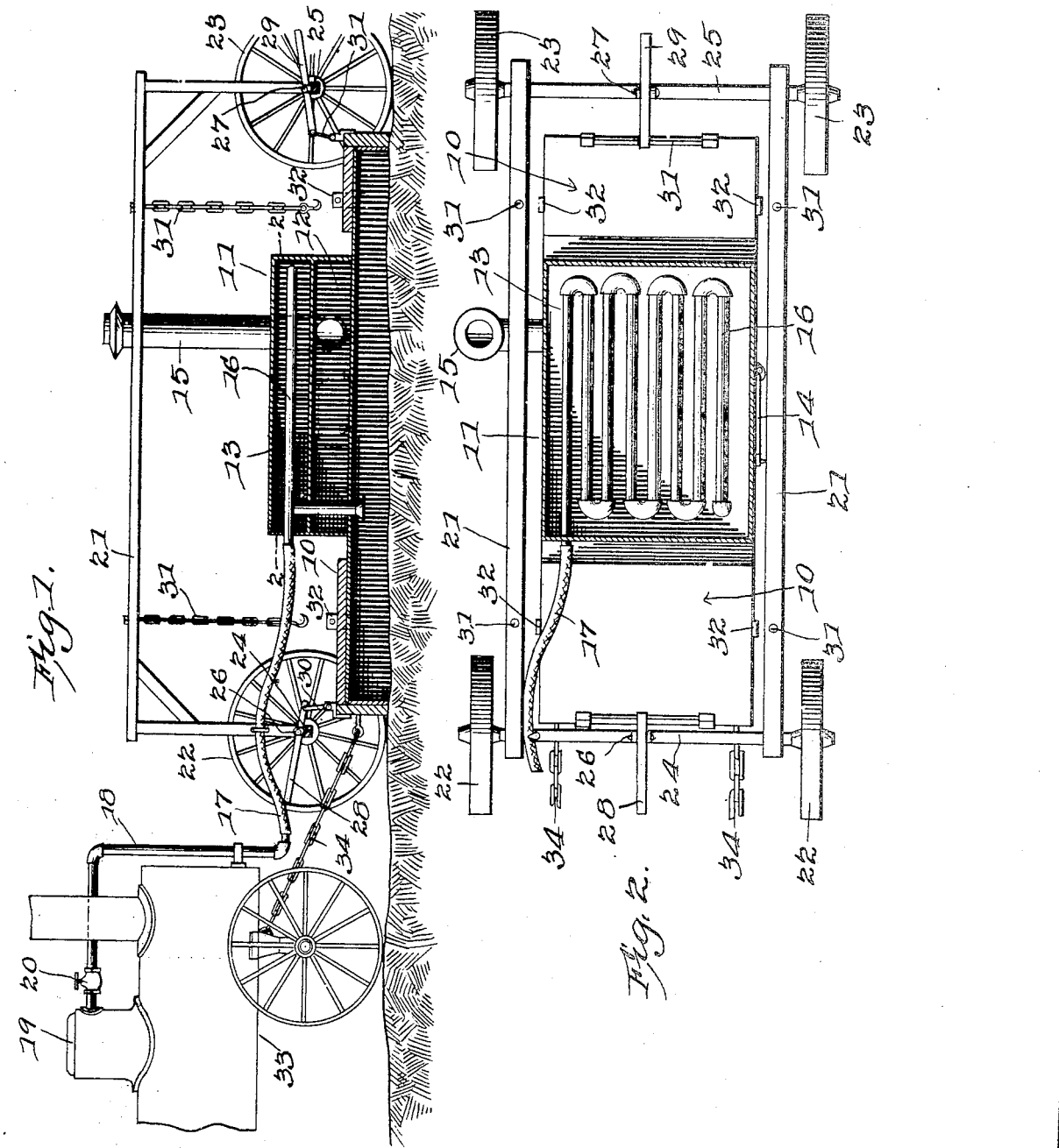

JOHN HENRY LONG JOHNSON, OF ASHBURN, TENNESSEE.

APPLIANCE FOR STEAMING PLANT-BEDS.

No. 835,621.  Specification of Letters Patent.  Patented Nov. 13, 1906.

Application filed October 21, 1905. Serial No. 283,842.

*To all whom it may concern:*

Be it known that I, JOHN HENRY LONG JOHNSON, a citizen of the United States, residing at Ashburn, in the county of Robertson and State of Tennessee, have invented a new and useful Appliance for Steaming Plant-Beds, of which the following is a specification.

This invention relates to apparatus for preparing the soil for planting or seeding, and has for its object to provide a simply-constructed apparatus whereby noxious seeds, seed-germs, roots, and other vegetation whose aftergrowth would be detrimental to the crop it is designed to cultivate are destroyed.

In preparing the soil for receiving certain kinds of seeds or plants it is of great advantage to destroy the seeds or germs of noxious weeds or other plants whose aftergrowth would be detrimental to the crop which it is desired to cultivate. Heat is generally employed to accomplish the desired results and has heretofore been applied in various ways and by employing various forms of devices, such as fires built upon the ground where the plants or seeds are to be placed; but this is objectionable because of the expense and labor and because of the undue amount of ashes remaining and carried into the soil with the rains or when preparing the soil for the seeds or plants.

In the improved device herein illustrated and described the heating qualities of steam are utilized to accomplish the desired results, and to effectually apply the steam to the soil is the principal object of the present invention.

Another object of the invention is to apply dry heat from a furnace or heating apparatus to the soil after treatment by the steam to accelerate the evaporation of the moisture resulting from the condensation of the steam, and thus correspondingly accelerate the preparation of the soil for the seeds or plants.

Another object of the invention is to provide a simply-constructed and compact apparatus whereby the steam and hot air may be effectually employed.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a side elevation, partly in longitudinal section, of the improved apparatus. Fig. 2 is a plan view in section on the line 2 2 of Fig. 1.

The improved apparatus comprises a casing or hood open at one side for placing over the ground, with the edges engaging the ground relatively steam-tight, and means for admitting steam to the hood.

The improved apparatus further comprises a casing or hood open at one side and bearing upon the ground and with means for admitting steam thereto and with a furnace associated therewith for heating the ground to accelerate the evaporation of the moisture left by the condensation of the steam.

The improved apparatus further comprises a hood or casing open on one side for bearing over the ground, a furnace for imparting heat to evaporate the moisture from the ground, and steam-piping within the influence of the heat from said furnace and leading into the hood.

The improved apparatus further comprises a frame mounted upon carrier-wheels and arranged to adjustably support the steaming-hood and its associated parts, whereby the same may be conveniently transported and actuated.

The hood or casing is represented at 10, preferably in the form of a rectangular box of suitable material, such as wood lined with sheet metal or wholly of sheet metal and with the side next the ground open, as shown. The box is relatively shallow and with the lower edges bearing upon the ground, so that the box is relatively steam-tight and may be rendered more completely steam-tight by banking with the loose earth after setting in position. Mounted upon the hood or casing 10 is another preferably smaller casing 11, having a furnace or fire-chamber 12, next the casing 10, and an upper chamber 13 above the fire-chamber. The fire-chamber 12 is provided with a firing-door 14 in one side and a smoke-stack 15 at the other side. Disposed within the upper chamber 13 is a coil of piping 16, with one end extended into the hood 10 and the other end provided with means, such as a flexible hose 17 and steam-pipe 18, for receiving steam from the generator, (represented at 19.) By this means steam is supplied to the hood 10, as required, the steam-pipe 18 having a controlling-valve 20. The coil of piping 16 is thus disposed within the influence of the heat radiating from the heating-chamber 12 and is thus superheated to a certain extent and its efficiency thereby increased.

A frame 21 is arranged for supporting the hood 10 and its associated parts and is mounted upon carrier-wheels 22 23 by axles 24 25. Pivoted at 26 27 to the axles 24 25 are levers 28 29, the latter coupled in turn at 30 31 to the hood 10 to provide means for lifting the hood and its attachments from the ground.

Means are provided, such as chains 31' and eyes 32, to hold the hood suspended from the frame 21 when the device is being transported.

The preferable means for transporting the hood and its associated parts is by a traction-engine, the boiler of the engine being utilized to supply the requisite steam, and for the purpose of illustration a portion of such an engine is shown at 33, with draft-chains 34 between the engine and hood.

The apparatus may be employed for treating the soil prior to planting for various kinds of crops, but is designed more particularly for treating soil where tobacco and similar crops are to be grown, and in operating the improved apparatus the soil is first prepared by plowing and harrowing or otherwise pulverizing and the hood 10, with its attachments, placed over a portion of the prepared soil, the lower edges banked, if required, and the steam turned on and allowed to flow for a sufficient length of time to thoroughly heat the soil to a sufficient extent to destroy all plant life therein. The condensation of the steam moistens the soil, and in certain kinds of soil moistens it to an unnecessary extent, and under these circumstances a fire is built in the furnace portion 12 of the device and the radiating heat therefrom utilized to accelerate the evaporation and the drying of the soil, and thus correspondingly accelerates the preparation of the soil for the seed or plants. When one section of the soil has been treated, the device is moved to another and the operation repeated, and so on until the whole field has been treated.

The time required for treating the soil varies according to the nature and condition of the soil and the depth to which the obnoxious plant life extends.

The device is simple in construction, can be inexpensively manufactured, and of any required size or of any suitable material.

Having thus descibed the invention, what is claimed is—

1. In a device of the class described, an inclosing hood open at one side for bearing by the open side relatively steam-tight upon the ground a heating-chamber disposed above said hood and means for introducing steam into said hood.

2. In a device of the class described, an inclosing hood open at one side for bearing by the open side relatively steam-tight upon the ground, a heating-chamber disposed above said hood, an inclosed chamber above said heating-chamber, a coil of piping within said inclosed chamber with one end leading into said hood, and means for conducting steam into said piping.

3. In a device of the class described, an inclosing hood open at one side for bearing by the open side relatively steam-tight upon the ground, a heating-chamber disposed above said hood, a coil of piping disposed within the influence of the heat from said heating-chamber with one end leading into said hood, and means for conducting steam into said piping.

In testimony that I claim the foregoing as my own I have hereto affixed my signature in the presence of two witnesses.

JOHN HENRY LONG JOHNSON.

Witnesses:
C. S. McINTOSH,
J. W. TOON.